United States Patent Office 3,422,596
Patented Jan. 21, 1969

---

3,422,596
HEAT SEALING APPARATUS
Norman J. Lyster, Burlington, Ontario, and Clarence M. Chambers, Islington, Ontario, Canada, said Lyster assignor to W. R. Grace & Co., Duncan, S.C., a corporation of Connecticut
Filed June 7, 1965, Ser. No. 464,267
U.S. Cl. 53—182    3 Claims
Int. Cl. B65b 9/12

---

ABSTRACT OF THE DISCLOSURE

This invention is directed to apparatus including a heat sealing bar that will at least partially surround a product enclosed in a thermoplastic film, and an air removal system comprising a cooperating framework disposed above the heat sealing bar and having a member such as chain mail suspended therefrom which conforms to the upper surface of the wrapped product and drives the air from the package as the framework is lowered into contact with the heat sealing bars, all as further described hereafter.

---

This invention relates to heat sealing apparatus. In one aspect, the invention relates to a device for heat sealing film enclosing a product. In another aspect the invention relates to a device for removing air from a package prior to heat sealing. The invention also relates to a device for producing a hermetic package.

Packaging of fresh meat portions, including fowl, in transparent film materials has been a widespread commercial success. Transparent film materials protect the product from dehydration and soiling in addition to enabling the customer to view the product. A particularly suitable and attractive transparent package is one in which the film closely conforms to the contours of the object forming a skin-tight covering having no air spaces or pockets between the film and the product. This process is aided by the use of a film which will shrink upon applying heat.

A difficulty in producing skin-tight packages, particularly with products having irregular surfaces, is the removal of air prior to sealing. If the air is not removed, an unsightly air bubble will develop between the product and the film. A number of air removal systems have been proposed including vacuumizing the "bag" prior to sealing. While vacuumizing produces an attractive package it is time consuming, expensive, requires special equipment and generally requires the use of bags or pouches which are more expensive than ordinary sheet film.

Another problem frequently encountered is that the seal produced is not air-tight. Thus, the package is limited to products unaffected by oxygen. In addition, subsequent handling techniques must be limited to non-liquid contact. For example, the freezing of fowl products wrapped in film is accomplished in at least two well known processes "blast freezing" (immersion in a very cold gas) or "liquid freezing" (immersion in a very cold liquid, e.g. ethylene glycol). If the seal is imperfect there is danger that the liquid used for freezing will leak into the package thus contaminating the product.

It is an object of the invention to provide apparatus for heat sealing film.

Another object of the invention is to provide apparatus for removing air from a package enclosed in a film to be heat sealed.

Yet another object is to provide apparatus for hermetically sealing film enclosing a product.

These and other objects of the invention will be readily apparent to those skilled in the art from the following disclosure, appended claims and drawing.

These objects are broadly accomplished by the use of a heat sealing bar at least partially surrounding the product which is enclosed in a thermoplastic film, and, in combination therewith, an air removal system comprising a cooperating framework disposed above said heat sealing bar and having a deformable member suspended therefrom which drives the air from the package as the framework is lowered into contact with the heat sealing bars.

In one embodiment the deformable member is a flexible belt such as chain mail, preferably containing small particles, such as metal shot or sponge rubber, to assist the member in better conforming to the surface of the product.

In another embodiment the heat sealing bar comprises a pair of parallel spaced apart sealing units.

In the practice of our invention, the objects being packaged are wrapped in a flexible, heat-shrinkable material. Suitable materials are well-known to those skilled in the art and include, but are not limited to, such materials as the monoaxially and biaxially oriented polyolefins, e.g., polypropylene and irradiated polyethylene, polyvinyl compounds such as vinylidene chloride copolymers, polyesters, polyethylene terephthalate and rubber hydrochloride films.

The thickness of the film material may vary with individual requirements but films normally employed in packaging usually range from 0.5 mil to 5 mils in thickness.

Heat-shrinking properties are produced in many thermoplastic, polymeric materials by heating the solid polymer to an elevated temperature, but below the melting point of the material, drawing the heated polymer in opposite directions thereby stretching and orienting the molecules in the polymer and cooling the polymer while under this stretching tension to a temperature at which the polymer will retain its stretched or oriented state when tension is released. In effect, the polymeric molecules are aligned and stretched in the direction or directions in which they are drawn and "frozen" in this new position. The subsequent application of heat to the polymeric material "thaws" the polymer and permits the polymeric molecules to return to their original pre-oriented position or state. It is preferred that the films be oriented in both lateral and longitudinal directions, as this results in a nearly equal shrinkage in all directions.

A particularly preferred film is irradiated, biaxially oriented polyethylene. In one method of manufacture the polyethylene is irradiated to an extent of about 12 megarads and then biaxially stretched 350 percent longitudinally and 350 percent laterally. The polyethylene film, so irradiated and oriented, has a shrink energy of about 150 pounds per square inch in both directions at 96° C. and has a tensile strength of at least 5000 pounds per square inch at 20° C. Detailed procedures for the preparation of irradiated, oriented polyethylene films are found in U.S. Patent 3,022,543 and in U.S. Patent No. 2,877,500, incorporated herein by reference.

The invention is not limited to a particular type of package. A preferred package is formed by enclosing the product, e.g. a whole or cut-up, dressed chicken in a tray, in a bag or envelope with the open sides then being heat sealed. It is frequently desirable to employ a center-folded film so that only three sides need be sealed. This may be even more simplified by sealing the side opposite the fold and also the trailing edge (adjacent the roll of film) in parallel seals while simultaneously cutting between the parallel seals so that the trailing edge of one package and the lead edge of the subsequent package are simultaneously sealed.

The invention is best described with reference to the drawings.

Figure 1:
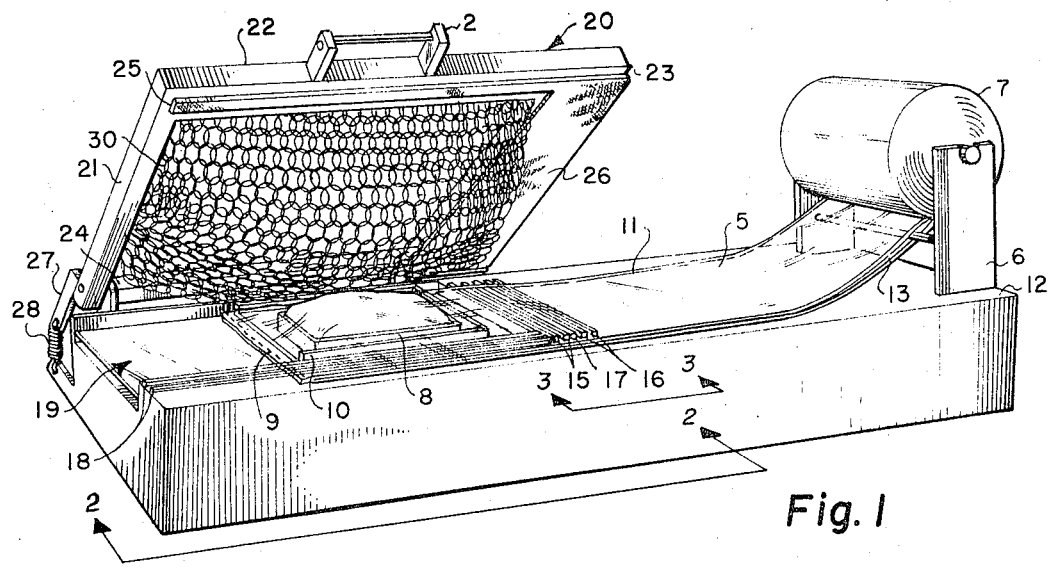
FIGURE 1 is a perspective view of the apparatus showing the package prior to the sealing operation.
Figure 2:
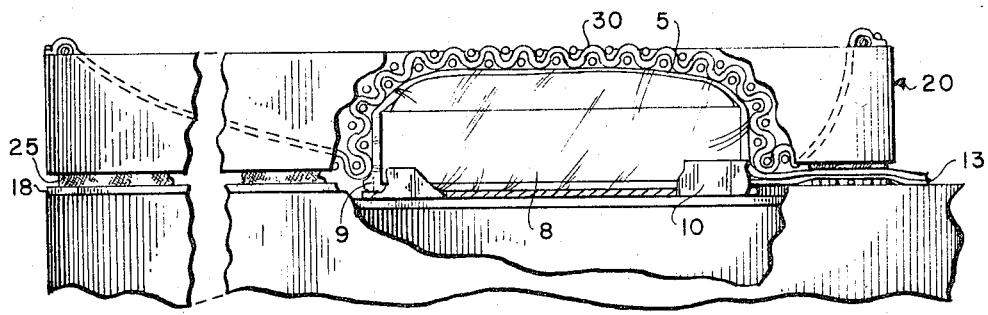
FIGURE 2 is an elevational view in partial section taken along the plane on the line 2—2 in FIGURE 1.
Figure 3:
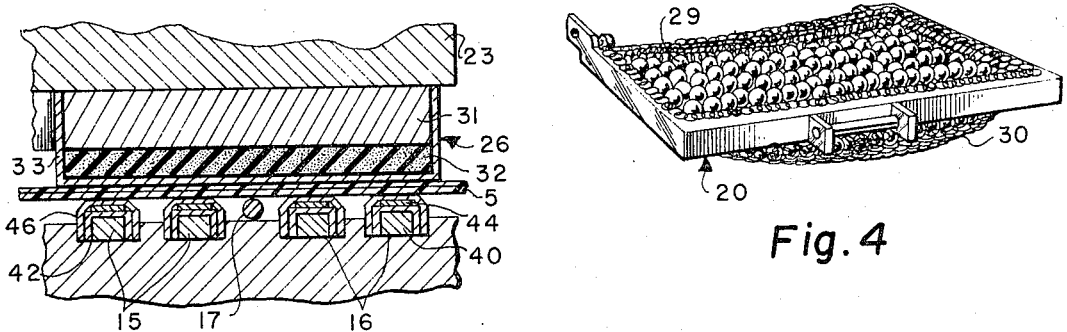
FIGURE 3 is a fragmentary vertical cross-sectional view taken along the plane of line 3—3 in FIGURE 2 showing the sealing and cut off units.

FIGURE 1 illustrates the device in use for packaging cut-up chicken in centerfolded film with the forward edge already sealed in the previous operation. A supply roll of film 7 is rotatably mounted on a framework 6. The film is shown centerfolded with the fold 11 at the rear; however, the film could be supplied as a single thickness and centerfolded immediately prior to the wrapping operation. The film is drawn by the operator (not shown) across the top of table surface 12. Since the forward edge 9 has been previously sealed, this leaves an opening 13 in the edge nearest the operator. The operator inserts the product into the envelope adjacent the sealed edge 9. The thus wrapped package 8 is then placed into a jig 10 which also results in more film being pulled off roll 7. The jig is positioned so that the edge of the tray is approximately ⅛" from the frame of the sealing bar and about ¼" from the cutting or severing wire 17. The base plate is set so that the edge of the tray is level with the seal bar; however, the product extends above the plane of the sealing bars. The package 8 is positioned in an area formed by sealing bars 15 and 18. Although the description of the invention is simplified by use of an L-shaped sealing unit, the scope of the invention is not so limited. The sealing bar can be adapted to fit any number of sides or any shape of package. The film can thus be sealed on 2 sides or any number of sides and need not be centerfolded nor presealed as illustrated.

The upper surface 46 of the sealing bars 15, 16 and 18 have sealing elements 44, such as electrically resistant wires suitably connected to a source of electrical current (not shown). In its simplest form a hot ribbon not only seals the two layers of film together but also cuts the film. Preferably the sealing and cutting follows a timed sequence, e.g. the sealing heat goes on in sealing bars 15, 16 and 17 and ½ second later the cutting heat is turned on in cutting wire 17. Thus a taut film is available, due to shrinkage, for the cutting step. It is generally preferred to avoid direct contact between the sealing bar and the film, e.g. a metal bar 40 is coated with Teflon 42, having the sealing ribbon 44 disposed on the upper surface thereon. The ribbon 44 is protected with a Teflon coating 46.

Cooperating with the sealing units 15, 16 and 18 is an upper member 20 which comprises a framework consisting of two side members 21 and 23, a forward member 22 with handle 2 attached thereto and a rear member 24. These members are positioned above the sealing bars and contain platens 25 and 26 which will contact the sealing units 18, 15 and 16 respectively when the upper member is depressed. These platens comprise a metal bar 31 surfaced by any suitable material such as a resilient foam material 32 having a low friction coating such as Teflon strip 33. Although the invention is thus described it will be understood that the platens may be located in the lower member 19 and the sealing elements in the upper element or the contacting members may be electrodes so as to seal by radio frequency energy. The upper member may be lowered into contact with the sealing bars by any suitable means. For example, the rear member of the upper member may be hinged to frame 27 and suitably attached to a spring 28 which keeps the upper member in the raised position except when a positive force is employed to lower it. The upper member may be attached to a foot pedal (not shown) through a connecting rod (not shown) so that when the operator has placed a package in the jig 10 and suitably positioned the film over the sealing elements, the foot pedal or handle 2 is depressed thus lowering the platens to contact the sealing units 15, 16 and 18.

It has now been found that if a very flexible and heavy belt like material, such as chain mail, 30 is loosely suspended to form a catenary between the frame elements of the upper member, the lowermost section of the chain mail will contact the upper surface of the film covering before the sealing bars and platens contact each other. This forces the air out of the package prior to sealing thus providing a much more attractive package. Since the chain mail has its lowest point in the center portion of the package, the continued lowering of the upper member causes the chain mail to conform to the irregularities of the product thus causing the film to conform to the product surface and improving the appearance after shrinking.

Figure 4:
FIGURE 4 is a view of a deformable member containing small shot.

It has also been found that if the chain mail is at least partially filled with small particles, 29 such as marbles, metal shot, sponge rubber, or the like, the conformity is improved. This feature is shown in FIGURE 4.

The sealed package is then removed from the jig 10 and, if a heat shrinkable film is employed, passed through a hot air or hot water shrink tunnel or the like maintained at suitable conditions of temperature to shrink the film to cause a skin-tight package. Because most of the air has been removed prior to sealing, there are no air bubbles to spoil the appearance of the package.

Since it is difficult to form a hermetic package by the use of sealing wires, it has also been found that the simultaneous formation of an edge seal and of a second seal spaced slightly inward therefrom produces a hermetic package. The edge seal is preferably thinner in width than the inner seal. The space in-between is not sealed and creates a dead-air space and also a buffer zone to stop any stress cracks that may develop in either of the seals, particularly the edge seal. In a preferred embodiment the two seals are about ⅛ inch in width and are about ¼ inch apart.

While certain examples, structures, composition and process steps have been described for purpose of illustration, the invention is not limited to these. Variations and modification within the scope of the disclosure and the claims can readily be effected by those skilled in the art.

The formation of multiple packages is readily accomplished by the device of this invention by subdividing the lower frame member with sealer-cut-off units to form compartments of the desired size and shape. The upper frame is similarly subdivided with matching dies or platens. Thus, a sheet of film is placed over the lower frame, several products positioned in the compartments formed by the sealing-cut-off units, a second sheet placed thereover, and the upper frame lowered to simultaneously seal the products into individual compartments while severing the compartments from each other to form a multiplicity of completely sealed, individual packages.

We claim:

1. Apparatus for heat sealing film wrapped about a product and sealed on two adjacent marginal portions comprising, in combination:

(a) an L-shaped sealing bar having an end sealing member and a side sealing member, at least one of said sealing members being a pair of parallel spaced apart sealing bars, (b) means for heating said sealing members above the fusion point of said film, (c) said bar forming a right angle and defining two sides of a first area adapted to receive said wrapped product, (d) means for positioning said wrapped product within said first area so that the unsealed marginal portions of said film are disposed on said sealing members, the upper portion of said product extending upwardly slightly through a first plane passing through the surface of said sealing members, (e) an upper member comprising two side members, a forward member and a rear member interconnected so as to define a second, open area positioned above said first area, said forward member and one of said side members having platens in the lower edges thereof and positioned in a second plane above said sealing members, said platens having the same configuration as said sealing members, (f) said rear member being hinged in said first plane, (g) a loosely hanging flexible member fixedly secured to the members forming said upper member and suspended across said second area to form an approximate catenary, the central portion of said loosely hanging flexible member suspended below said platens in a plane intermediate said first and second planes so that when said upper member is lowered the loosely hanging flexible member depresses the film to conform to the product surface configuration thus forcing the air out of the package before the sealing members and platens seal the film, and (h) a cutting means disposed parallel and adjacent to the end sealing member to sever the film.

2. The apparatus of claim 1 wherein said loosely hanging flexible member is chain mail.

3. The apparatus of claim 2 wherein small particles are positioned on said chain mail to assist in conforming the chain mail to the product configuration.

References Cited

UNITED STATES PATENTS

| | | | |
|---|---|---|---|
| 2,932,927 | 4/1960 | Seferstrom et al. | 53—22 X |
| 3,047,991 | 8/1962 | Siegel et al. | 53—182 |
| 3,120,728 | 2/1964 | Snow et al. | 53—184 X |
| 3,239,993 | 3/1966 | Cherrin | 53—182 |
| 3,257,769 | 6/1966 | Ford | 53—184 X |
| 3,323,282 | 6/1967 | Duns | 53—182 |

TRAVIS S. McGEHEE, *Primary Examiner.*

U.S. Cl. X.R.

53—390